United States Patent
Sydon et al.

(10) Patent No.: US 6,928,303 B2
(45) Date of Patent: Aug. 9, 2005

(54) METHODS AND APPARATUS FOR COMBINED WIRELESS DATA AND VOICE COMMUNICATIONS

(75) Inventors: Uwe Sydon, Dusseldorf (DE); Holger Steinbach, Round Rock, TX (US)

(73) Assignee: Siemens Communications, Inc., Boca Raton, FL (US)

( * ) Notice: Subject to any disclaimer, the term of this patent is extended or adjusted under 35 U.S.C. 154(b) by 523 days.

(21) Appl. No.: 09/777,271

(22) Filed: Feb. 5, 2001

(65) Prior Publication Data

US 2002/0107047 A1 Aug. 8, 2002

(51) Int. Cl.[7] .................................................. H04B 1/38
(52) U.S. Cl. .................. 455/561; 455/63.1; 455/67.11; 370/447
(58) Field of Search .............................. 455/63.1, 63.2, 455/63.3, 67.11, 67.12, 67.13, 67.15, 561, 454, 451, 452.1; 370/445, 446, 447, 448, 338

(56) References Cited

U.S. PATENT DOCUMENTS 5,515,374 A * 5/1996 Atkinson ..................... 370/433

2002/0061031 A1 * 5/2002 Sugar et al. ................ 370/466

\* cited by examiner

*Primary Examiner*—Lee Nguyen

(57) ABSTRACT

Methods and apparatus for combined wireless telephony and data communication of the present invention include providing a Home RF transceiver and a WDCT transceiver in a common enclosure and synchronizing the operation of the Home RF transceiver to specific time slots in the WDCT TDM frame. More particularly, the Home RF transceiver is prevented from transmitting whenever the WDCT transceiver is receiving and is prevented from receiving whenever the WDCT transceiver is transmitting. This effectively prevents the Home RF transceiver from interfering with the WDCT transceiver and vice versa. According to a presently preferred embodiment, synchronization is keyed to the repeating WDCT TDM frame but is dynamically adjustable based on the actual use of bandwidth by the WDCT devices. Thus, when there is no telephony traffic, the Home RF transceiver has full bandwidth. For each WDCT telephone call in progress, no more than $\frac{1}{12}$ of the Home RF transceiver bandwidth is sacrificed. The methods and apparatus of the invention allow the reuse of key components from existing standards to provide a combined voice and data base station. The invention also takes advantage of two proven technologies to achieve its goals.

19 Claims, 3 Drawing Sheets

METHODS AND APPARATUS FOR COMBINED WIRELESS DATA AND VOICE COMMUNICATIONS

BACKGROUND OF THE INVENTION

1. Field of the Invention

The invention relates to wireless communications. More particularly, the invention relates to methods and apparatus for combined wireless data and voice communications using the same frequency spectrum.

2. Brief Description of the Prior Art

One of the important socioeconomic changes of the last decade is the rising preponderance of the "home office". Largely because of advances made in personal computer technology, people are now able to work at home doing things which once required that they travel to an office. People who work in an office, now take the opportunity to bring work home. This allows them to spend more time with their family without adversely affecting their productivity. The home office revolution has also given rise to an increasing number of home businesses in which the home office is the only office.

The typically well equipped home office today includes one or more personal computers, a laser printer, a fax machine, a photocopier and two or more phone lines. As a home office grows, it is desirable to connect the computers and printers to a network and increase the number of telephones and telephone lines. In a commercial office building, wiring for networks and telephones is either pre-installed or easy to install via preinstalled closets and conduits. Most homes, however, are not pre-wired for a computer network, nor are they pre-wired for more than two telephone lines.

Recognizing the difficulty presented for home office networks, several major technology vendors have proposed various wireless solutions. There are two major wireless standards. One, proposed by Lucent Technologies and Apple Computer is known as IEEE 802.11 Direct Sequence Spread Spectrum (DSSS) and supports data rates of up to 11 megabits per second at distances up to 150 feet. It is sold under the trademarks "AirPort" and "Skyline", among others.

The other wireless standard, which is supported by a long list of technology companies including IBM, Xerox, and Intel, to name a few, is known as "HomeRF" or SWAP (Shared Wireless Access Protocol). HomeRF has the same 150 foot range as IEEE 802.11 but initially only supported a data rate of up to 2 megabits per second. The specification for HomeRF was recently revised to support 10 megabits per second.

Both HomeRF and IEEE 802.11 utilize the 2.4 gigahertz band for wireless communications and manage network access via CSMA (carrier sense multiplex access). In a typical setup, a base station transceiver is coupled to a telecommunications link such as a telephone line, a DSL modem, or a cable modem and computers are provided with transceiver cards which allow them to share the communications link and communicate with each other via the base station.

Both HomeRF and IEEE 802.11 offer cost efficient solutions for networking computers and printers without wires and should be popular in home offices. However, neither of these wireless networking standards addresses the need for more phones and phone lines in a home office. Many home offices use cordless telephones to avoid the need for wiring new phones and new phone lines.

Recently a new class of cordless telephones has been developed. These new phones are based on the DECT (Digitally Enhanced Cordless Telecommunications) standard and offer many of the features previously only available in an office PBX system.

Siemens Corporation has introduced a proprietary version of DECT based telephones called WDCT (Worldwide Digital Cordless Communications). Hardware to support WDCT is commercially available from Infineon Technologies, AG which manufactures, for example, transceivers for 2.4 GHz cordless applications (WDCT Transceiver PMB5614), a WDCT handset controller and a WDCT basestation controller. The Siemens telephone sets include a base station transceiver, which is coupled to telephone lines and cordless handsets which access the telephone lines by communicating with the base station transceiver. The base station transceiver supports multiple phone lines and multiple hand sets.

WDCT telephones operate in the 2.4 gigahertz band. Access under WDCT is governed by a repeating TDM (Time Division Multiplexing) frame during which specific time slots are allocated for transmission and reception. Since the new cordless telephones operate in the same band as the new wireless networks, it is important that the respective base stations be placed far enough apart that they do not interfere with each other.

One of the problems faced by home offices is space. Many home offices occupy a spare bedroom or a den and the space soon feels cluttered with office equipment. Many companies have addressed this problem in a number of ways. Personal computers have become smaller. Many companies now offer a combination printer, scanner, copier, fax machine which is a single unit that takes the place of four separate units.

Similarly, it would be desirable to provide a single wireless base station to serve all of the wireless networking needs of a home office. However, since the new cordless telephones operate in the same band as the new wireless networks, it prohibits providing a single base station transceiver which could be used for cordless telephones as well as for wireless networking.

SUMMARY OF THE INVENTION

It is therefore an object of the invention to provide methods and apparatus for combined wireless data and voice communication.

It is also an object of the invention to provide methods and apparatus for combined telephony and data communication which utilize the same frequency band.

It is another object of the invention to provide methods and apparatus for combined telephony and data communication which utilize the same frequency band while avoiding interference.

It is still another object of the invention to provide a wireless base station which supports Home RF networking as well as WDCT telephony.

It is yet another object of the invention to provide a wireless base station which supports Home RF networking as well as WDCT telephony without interference.

Furthermore, it is another object of the invention to provide a wireless base station which supports Home RF networking as well as WDCT telephony which manages bandwidth efficiently.

Still further, it is another object of the invention to provide a wireless base station which supports Home RF networking as well as WDCT telephony which is operable with existing Home RF network nodes and existing WDCT hand sets.

In accord with these objects, which will be discussed in detail below, the methods and apparatus for combined telephony and data communication of the present invention include providing a Home RF transceiver and a WDCT transceiver in a common enclosure and synchronizing the operation of the Home RF transceiver to specific time slots in the WDCT TDM frame.

More particularly, according to the invention, the Home RF transceiver is prevented from transmitting whenever the WDCT transceiver is receiving and is prevented from receiving whenever the WDCT transceiver is transmitting. This effectively prevents the Home RF transceiver from interfering with the WDCT transceiver and vice versa.

According to a presently preferred embodiment of the invention, synchronization is keyed to the repeating WDCT TDM frame but is dynamically adjustable based on the actual use of bandwidth by the WDCT devices. Thus, when there is no telephony traffic, the Home RF transceiver has full bandwidth.

For each WDCT telephone call in progress, no more than $\frac{1}{12}$ of the Home RF transceiver bandwidth is sacrificed.

The methods and apparatus of the invention allow the reuse of key components from existing standards to provide a combined voice and data base station. The invention also takes advantage of two proven technologies to achieve its goals.

DETAILED DESCRIPTION

Figure 1:
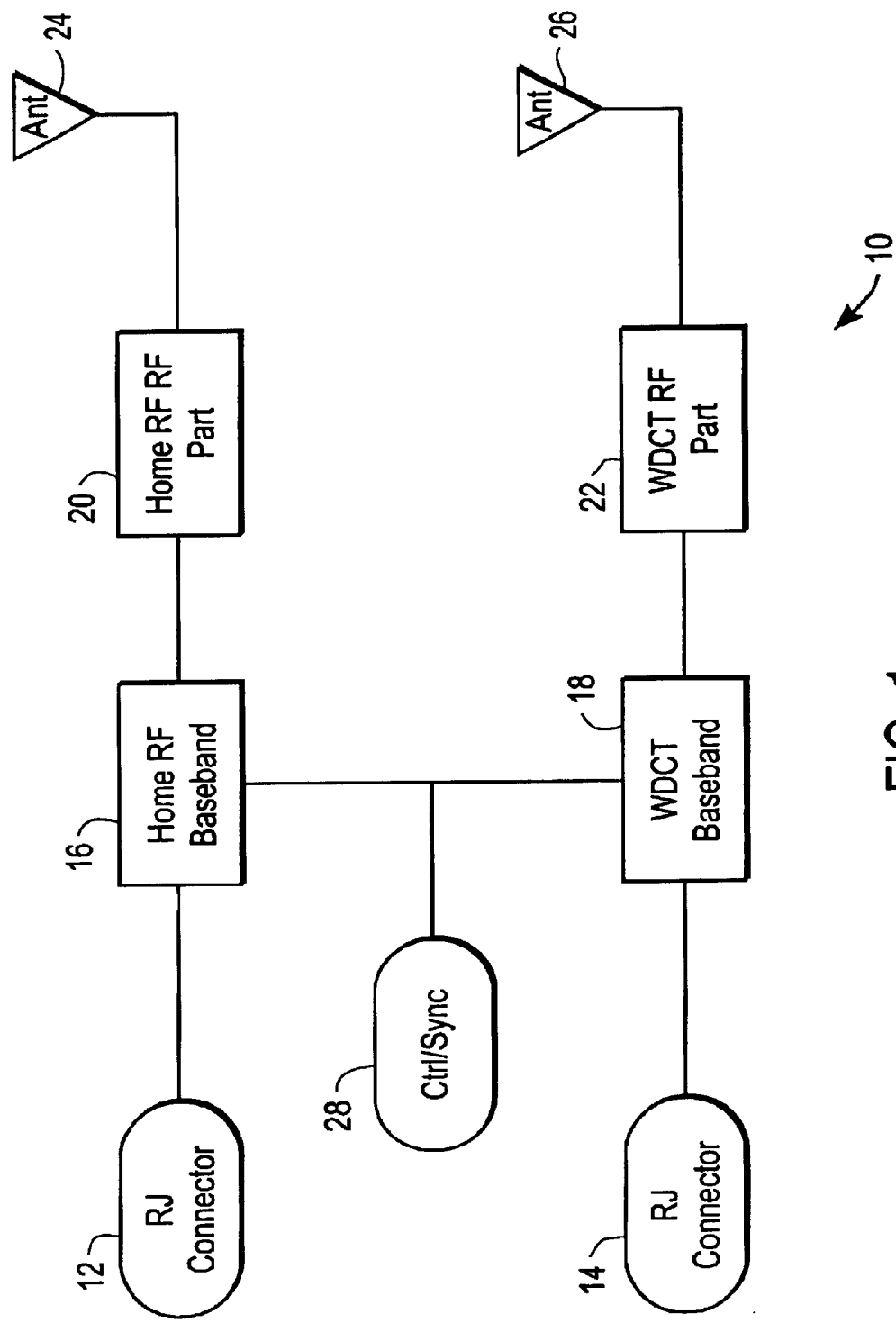
FIG. 1 is a high level block diagram of a combined Home RF and WDCT base station according to the invention.

Turning now to FIG. 1, an exemplary wireless base station 10 is depicted that, according to one embodiment of the invention, includes at least two RJ connectors 12, 14, a baseband Home RF section 16, a baseband WDCT section 18, a Home RF RF modulator part 20, a WDCT RF modulator part 22, respective antennae 24, 26 for Home RF and WDCT, and control/synchronization circuit 28.

The RJ connectors 12, 14 typically include one or more RJ-11 jacks for coupling to plain old telephone service (POTS) and one or more RJ-45 jacks for coupling to ISDN (integrated services digital network) service, broadband modems, and/or local area networks. The RJ connector(s) 12 are coupled to the Home RF baseband section 16 and the RJ connector(s) 14 are coupled to the WDCT baseband section 18.

The Home RF baseband section 16 is coupled to the Home RF RF modulator part 20 which is coupled to the antenna 24. The WDCT baseband section 18 is coupled to the WDCT RF modulator 22 which is coupled to the antenna 26.

The control/synchronization circuit 28 is shown in FIG. 1 as coupled to the Home RF baseband section 16 and the WDCT baseband section 18. The control/synchronization circuit 28, according to the invention, monitors activity of the WDCT baseband section 18 and controls the operation of the Home RF baseband section 16 according to the exemplary protocols described below with reference to FIGS. 3 and 4.

In order to appreciate the methods of the invention, however, it is first necessary to understand how the 2.4 gHz spectrum is utilized by Home RF and WDCT respectively.

Figure 2:
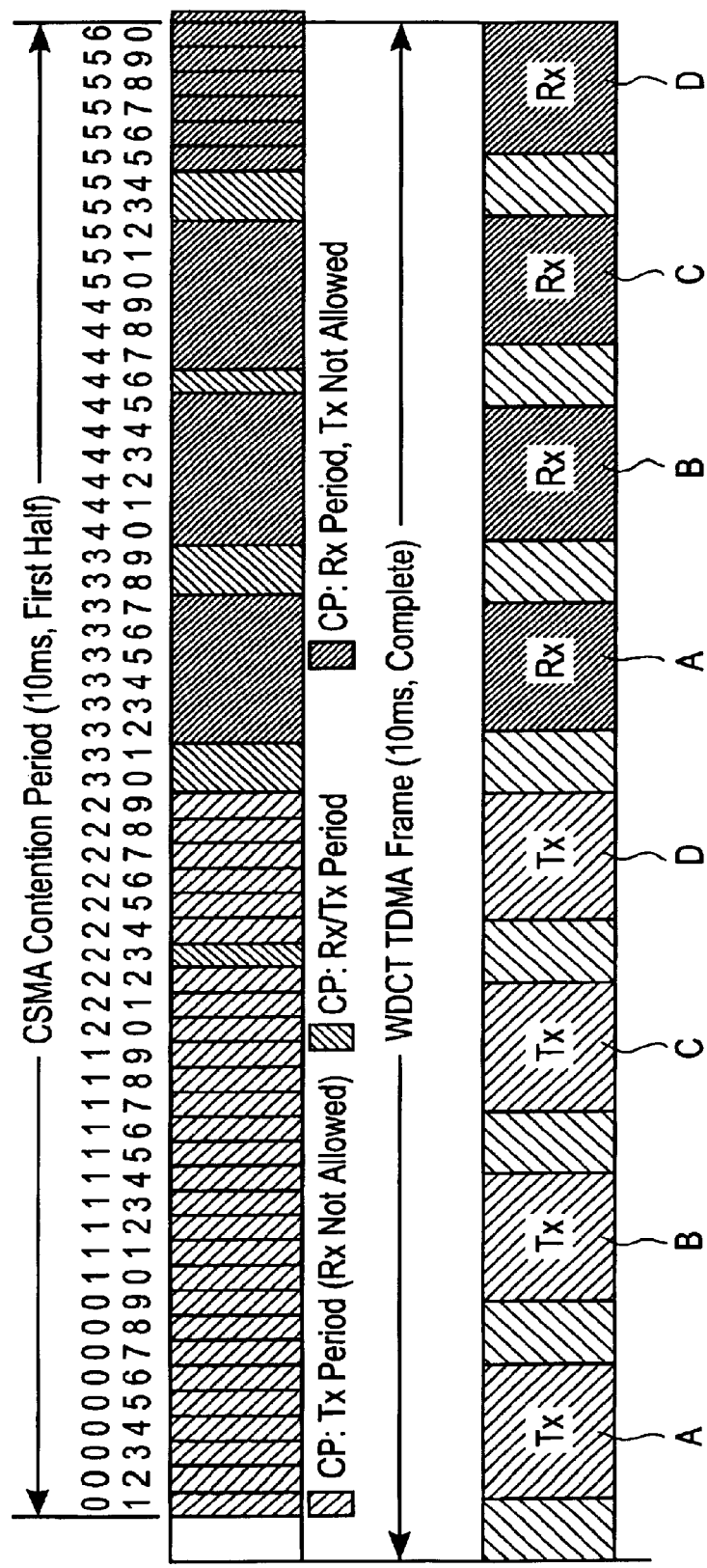
FIG. 2 is a comparison of the WDCT TDM frame with the Home RF CSMA contention period.

Turning now to FIG. 2, a WDCT repeating frame of 10 ms in duration is shown in the lower portion of FIG. 2. During the first half of the frame, four transmission channels (time slots) are provided; and during the second half of the frame, four reception channels (time slots) are provided. This allocation of transmit and receive channels enables the WDCT base station to communicate with up to four different hand sets and service up to four different telephone calls "simultaneously".

As shown in FIG. 2, channel "A" is given the opportunity to transmit during a first time period, after which channel "B" is permitted to transmit, followed by channels "C" and "D". After each of the four channels have been given the opportunity to transmit, each is given the opportunity to receive. The times for channels A–D reception is shown in the lower right portion of FIG. 2. As shown in FIG. 2, there are unused time slots ("blind slots") between each transmission slot and each reception slot.

Home RF does not provide pre-assigned channels or time slots for transmission and reception. Rather, Home RF provides a 20 ms contention period which is divided into 120 slots (packet times). These slots are available for transmission and reception on a contention basis.

For example, a node wishing to transmit seizes use of the spectrum when it determines that it is not being used by another node. If the spectrum is being used by another node, nodes wanting to transmit will wait. This type of "bursty" spectrum allocation is perfectly acceptable for data traffic in a LAN or a WAN.

However, bursty spectrum allocation is not acceptable for high quality telephony service such as WDCT. Thus, the WDCT standard "provisions" bandwidth as shown in the lower part of FIG. 2.

From the foregoing, those skilled in the art will appreciate that in order to maintain the quality of service in WDCT, it must be given priority over Home RF when sharing the same spectrum.

One way of assuring that Home RF and WDCT do not interfere with each other is to limit Home RF operation to the blank slots between the transmission and reception periods used by WDCT. However, such a limitation would severely limit the bandwidth of Home RF.

According to the present invention, in addition to allowing Home RF to transmit or receive during the blank slots in the WDCT frame, it is allowed to transmit whenever WDCT is transmitting and it is allowed to receive whenever WDCT is receiving. Further, according to the invention, Home RF is allowed to transmit or receive during WDCT channels which are not actually being used.

Looking further at FIG. 2, it can be seen that the upper portion of the figure is shaded to indicate how Home RF may use the spectrum while avoiding interference with/from WDCT.

Thus, during each of the transmit channel times provisioned by WDCT, Home RF may also transmit but may not receive. During each of the receive channel times provisioned by WDCT, Home RF may also receive but may not transmit. Further, during each of the blank slots between channels provisioned by WDCT, Home RF may transmit or receive.

It should be noted that FIG. 2 illustrates the maximum spectrum use by WDCT and thus a "worst case" for Home RF. If WDCT is not in use (i.e. no telephone calls in progress) all of the spectrum is available to Home RF. If only one call is in progress, the B, C, and D transmit and receive time slots will be available for use by Home RF.

As illustrated in FIG. 2, each of the transmit and receive slots provisioned by WDCT has a duration of approximately 5 packet slots from the CSMA contention period. Thus, each provisioned telephone channel in use affects approximately 10 out of every 60 Home RF packet slots. It must be noted that Home RF does not completely sacrifice 10/60 slots for each phone call in progress; it merely limits activity to either transmitting or receiving.

The actual loss in bandwidth of Home RF for each telephone call in progress depends on the nature of the data traffic. If the data traffic is much heavier in one direction than the other, approximately 5 packet slots out of every 60 will be useless (e.g. times when Home RF needs to transmit but is prevented from doing so). If the traffic on the Home RF system is fairly balanced (equal number of packets being transmitted and received during the contention period), the impact of WDCT spectrum use on Home RF bandwidth will be negligible.

Figure 3:
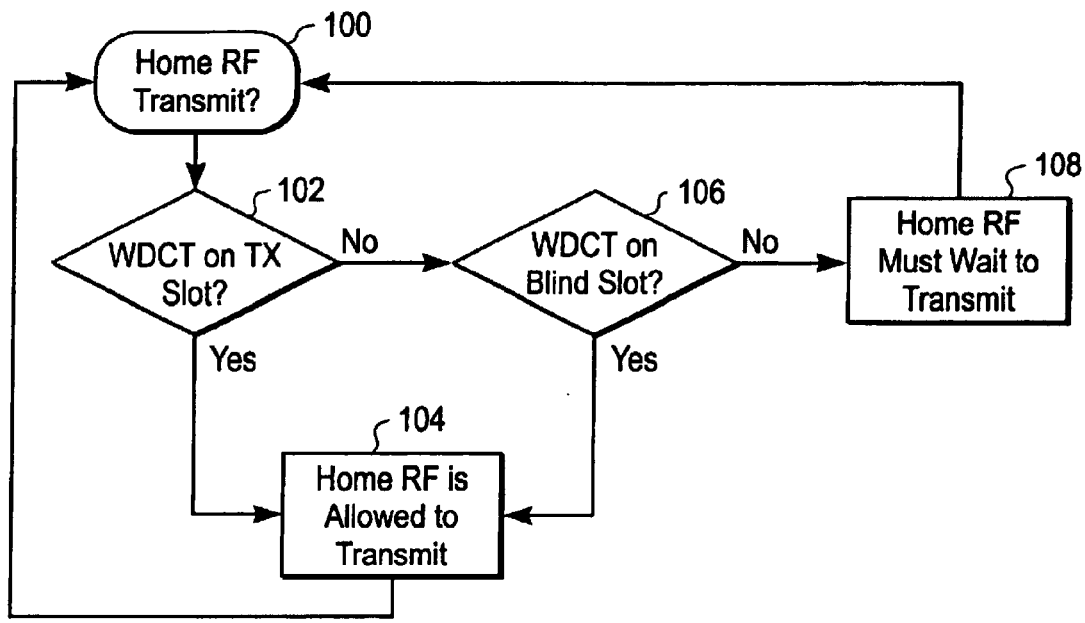
FIG. 3 is a simplified flow chart illustrating control over Home RF transmission to prevent interference with WDCT reception according to the invention.
Figure 4:
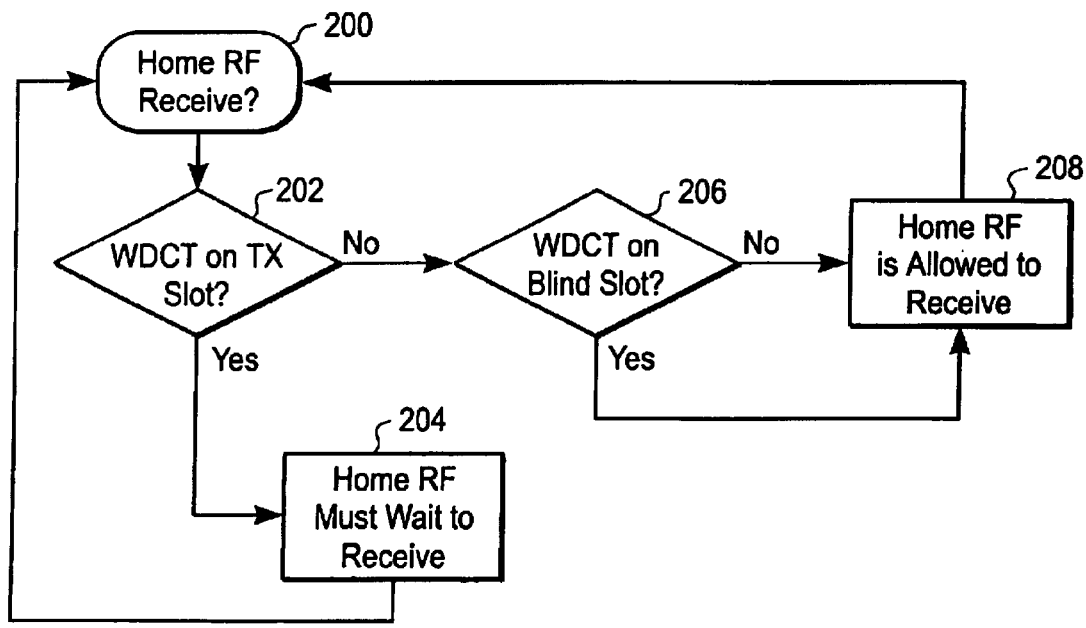
FIG. 4 is a simplified flow chart illustrating control over Home RF reception to prevent interference from WDCT transmission.

From the foregoing, those skilled in the art will appreciate that there are many ways of monitoring spectrum use by the WDCT transceiver and regulating spectrum use by the Home RF transceiver. FIGS. 3 and 4 illustrate presently preferred methods for regulating transmission and reception of the Home RF portion of the base station (10 in FIG. 1) based on spectrum use by the WDCT portion of the base station.

Turning first to FIG. 3, if it is determined at 100 that the Home RF baseband section (16 in FIG. 1) has data to transmit to a wireless network node (not shown), the controller/synchronizer (28 in FIG. 1) determines at 102 whether WDCT is transmitting.

If WDCT is transmitting, Home RF is permitted at 104 to transmit. If it is determined at 102 that WDCT is not transmitting, it is further determined at 106 whether WDCT is on a blind slot. If it is on a blind slot, Home RF is permitted at 104 to transmit.

If it is determined at 106 that WDCT is not on a blind slot, it is presumed to be receiving and Home RF must wait at 108 before transmitting.

According to an alternate embodiment of the invention, controller/synchronizer 28 takes note of which channels (A–D) are in actual use and will determine whether in fact WDCT is in an active receive slot in order to determine whether Home RF be permitted to transmit.

Referring now to FIG. 4, if it is determined at 200 that the Home RF baseband section (16 in FIG. 1) does not have data to transmit to a wireless network node (not shown), the controller/synchronizer (28 in FIG. 1) assumes that it needs to be in receive mode. It is determined at 202 whether WDCT is transmitting. If WDCT is transmitting, Home RF is prevented at 204 from receiving to save power. If HomeRF is not powered off, it will receive garbage and recognize it as such, thus preventing transmission of an Acknowledgement to the "A Node" that sent the garbage.

If WDCT is not transmitting, the Home RF is permitted to receive at 208, regardless of any determination made at 206 regarding whether WDCT is receiving or in a blind slot.

There have been described and illustrated herein methods and apparatus for providing combined wireless voice and data networks in a single base station. While particular embodiments of the invention have been described, it is not intended that the invention be limited thereto, as it is intended that the invention be as broad in scope as the art will allow and that the specification be read likewise. It will therefore be appreciated by those skilled in the art that yet other modifications could be made to the provided invention without deviating from its spirit and scope as so claimed.

What is claimed is:

1. A base station for combined wireless data and wireless telephony communication utilizing the same frequency spectrum, comprising:

(a) a data transceiver for transmitting and receiving wireless data, said data transceiver associated with a contention period, the contention period comprising one or more data transmit periods, a data transmit period indicating when data may be transmitted;

(b) a telephony transceiver for transmitting and receiving wireless voice signals, said telephony transceiver associated with a frame, the frame comprising one or more voice transmit periods, a voice transmit period indicating when a voice signal may be transmitted, at least a first portion of a voice transmit period concurrent with at least a second portion of a data transmit period;

(c) a controller/synchronizer coupled to said data transceiver and said telephony transceiver operable to:

monitor operation of said telephony transceiver to determine that said telephone transceiver is in the first portion of the voice transmit period concurrent with the second portion of the data transmit period; and control operation of said data transceiver in response thereto by allowing the data transceiver to transmit data in response to the determination; and wherein said data transceiver includes a baseband portion and an RF portion, said telephony transceiver includes a baseband portion and an RF portion, and said controller/synchronizer is coupled to said respective baseband portions.

2. A base station according to claim 1 wherein said controller/synchronizer prevents said data transceiver from transmitting when said telephony transceiver is receiving, and further wherein said controller/synchronizer prevents said data transceiver from receiving when said telephony transceiver is transmitting.

3. A base station according to claim 1 further comprising:

(d) a first antenna coupled to said RF portion of said data transceiver; and (e) a second antenna coupled to said RF portion of said telephony transceiver.

4. A base station according to claim 1 wherein said data transceiver is a carrier sense multiplexing transceiver, and said telephony transceiver is a time division multiplexing transceiver.

5. A base station according to claim 4 wherein said data transceiver is a Home RF transceiver, and said telephony transceiver is a WDCT transceiver.

6. A method for combined wireless data and telephony communication using the same frequency spectrum comprising the steps of:

(a) providing separate data and telephony transceivers;

(b) monitoring the telephony transceiver to determine whether telephony signals are being transmitted or received;

(c) controlling operation of the data transceiver in response said monitoring; and wherein said data transceiver includes a baseband portion and an RF portion, said telephony transceiver includes a baseband portion and an RF portion, and said step of monitoring includes monitoring the baseband portion of the telephony transceiver, and said step of controlling includes controlling the baseband portion of the data transceiver.

7. A method according to claim 6 wherein said step of controlling further comprises the steps of:
   (a) preventing data transmission when telephony signals are being received; and
   (b) preventing data reception when telephony signals are being transmitted.

8. A method according to claim 6 further comprising the step of providing separate antennae for the respective RF portions.

9. A method according to claim 6 wherein the data transceiver is a carrier sense multiplexing transceiver, and the telephony transceiver is a time division multiplexing transceiver.

10. A method according to claim 9 wherein the data transceiver is a Home RF transceiver, and the telephony transceiver is a WDCT transceiver.

11. A method according to claim 9 wherein the telephony transceiver transmits and receives according to a repeating frame having a plurality of time slots including transmit time slots, receive time slots, and blind time slots, said step of monitoring includes monitoring the repeating frame, and said step of controlling includes preventing the data transceiver from transmitting when the telephony transceiver is receiving, and preventing the data transceiver from receiving when the telephony transceiver is transmitting.

12. A base station for combined wireless LAN and telephony using the same frequency spectrum, said base station comprising:
   (a) a LAN transceiver, said LAN transceiver associated with a contention period, the contention period comprising one or more data transmit periods, a data transmit period indicating when data may be transmitted;
   (b) a telephony transceiver, said telephony transceiver associated with a frame, the frame comprising one or more voice transmit periods, a voice transmit period indicating when a voice signal may be transmitted, at least a first portion of a voice transmit period concurrent with at least a second portion of a data transmit period;
   (c) control means operable to:
      monitor operation of said telephony transceiver to determine that said telephone transceiver is in the first portion of the voice transmit period concurrent with the second portion of the data transmit period; and
      control operation of said LAN transceiver in response thereto by allowing the data transceiver to transmit data in response to the determination; and
   wherein said LAN transceiver includes a baseband portion and an RF portion, said telephony transceiver includes a baseband portion and an RF portion, and said control means coupled to said respective baseband portions.

13. A base station according to claim 12 wherein said control means prevents said LAN transceiver from transmitting when said telephony transmitter is receiving and prevents said LAN transceiver from receiving when said telephony transceiver is transmitting.

14. A base station according to claim 13 wherein said LAN transceiver is a carrier sense multiplex transceiver, and said telephony transceiver is a time division multiplex transceiver.

15. A base station according to claim 14 wherein said LAN transceiver is a Home RF transceiver and said telephony transceiver is a WDCT transceiver.

16. A base station according to claim 14 wherein said telephony transceiver supports up to four simultaneous conversations.

17. A base station according to claim 16 wherein no more than $1/12$ of the LAN transceiver bandwidth is sacrificed for each conversation in progress.

18. A base station for combined wireless data and wireless telephony communication utilizing the same frequency spectrum, comprising:
   (a) a data transceiver for transmitting and receiving wireless data, said data transceiver associated with a contention period, the contention period comprising one or more data transmit periods, a data transmit period indicating when data may be transmitted;
   (b) a telephony transceiver for transmitting and receiving wireless voice signals, said telephony transceiver associated with a frame, the frame comprising one or more voice transmit periods, a voice transmit period indicating when a voice signal may be transmitted, at least a first portion of a voice transmit period concurrent with at least a second portion of a data transmit period, wherein the data transceiver and the telephony transceiver are operable to simultaneously transmit signals; and
   (c) a controller/synchronizer coupled to said data transceiver and said telephony transceiver operable to:
      monitor operation of said telephony transceiver to determine that said telephone transceiver is in the first portion of the voice transmit period concurrent with the second portion of the data transmit period; and
      control operation of said data transceiver in response thereto by allowing the data transceiver to transmit data in response to the determination.

19. A method for combined wireless data and telephony communication using the same frequency spectrum comprising the steps of:
   (a) providing separate data and telephony transceivers, said data transceiver associated with a contention period, the contention period comprising one or more data transmit periods, a data transmit period indicating when data may be transmitted, said telephony transceiver associated with a frame, the frame comprising one or more a voice transmit periods, a voice transmit period indicating when voice signal may be transmitted, at least a first portion of a voice transmit period concurrent with at least a second portion of a data transmit period, wherein the data transceiver and the telephony transceiver are operable to simultaneously transmit signals;
   (b) monitoring the telephony transceiver to determine whether telephony signals are being transmitted or received to determine that said telephone transceiver is in the first portion of the voice transmit period concurrent with the second portion of the data transmit period;
   (c) controlling operation of the data transceiver in response said monitoring by allowing the data transceiver to transmit data in response to the determination; and
   (d) simultaneously transmitting signals from the separate data and telephony transceivers.

* * * * *